May 8, 1934.   W. L. PATTERSON ET AL   1,958,280
MICROSCOPE
Filed Dec. 5, 1931   3 Sheets-Sheet 3
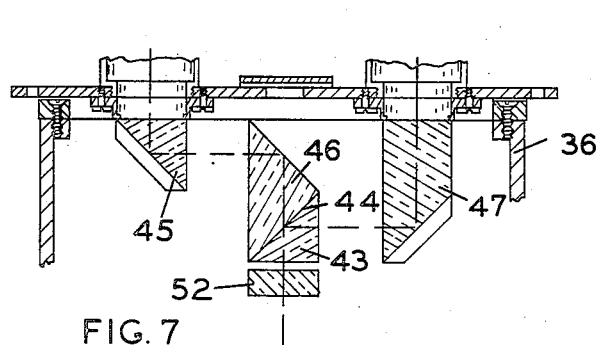
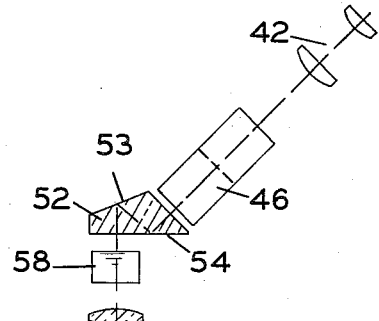
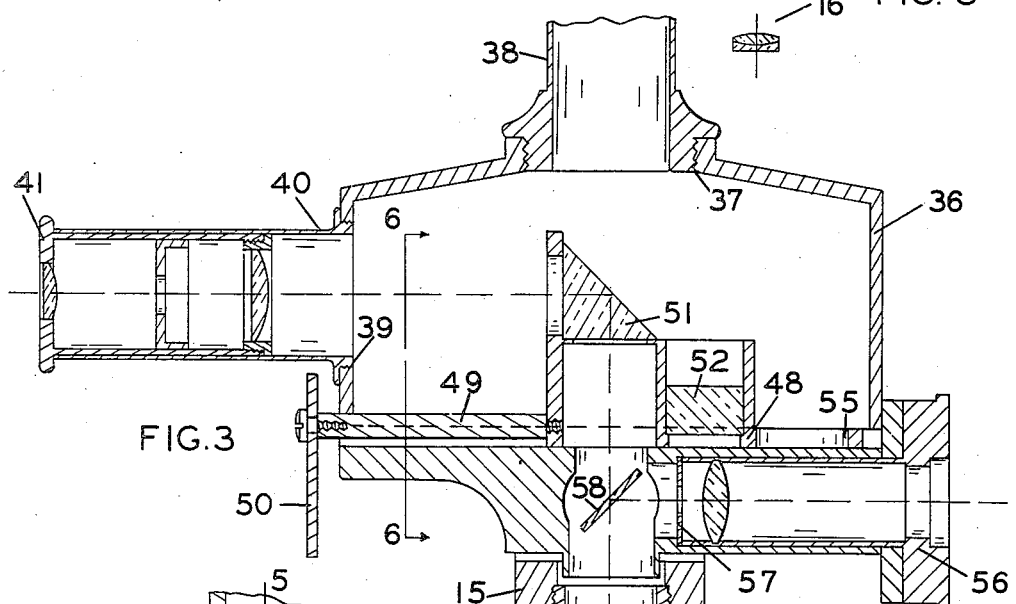
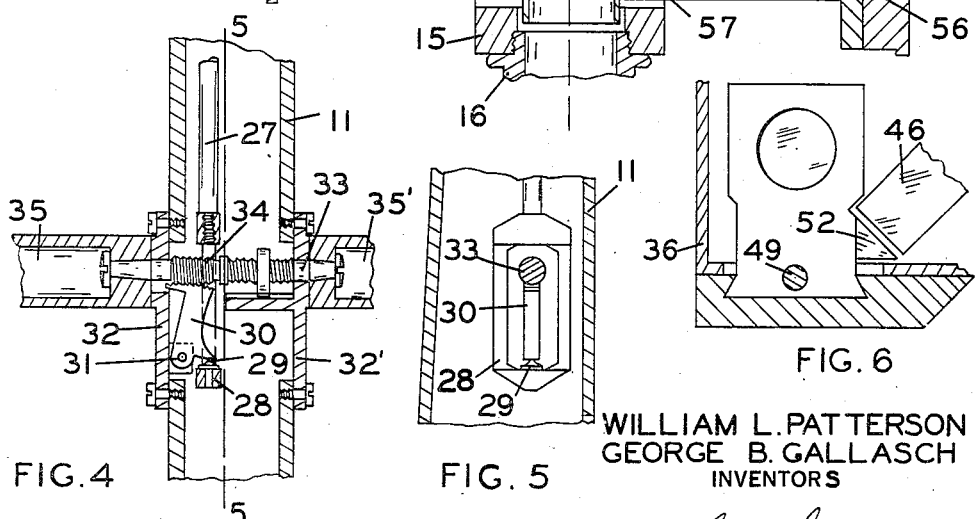
WILLIAM L. PATTERSON
GEORGE B. GALLASCH
INVENTORS
BY *G. A. Ellestad*
ATTORNEY Patented May 8, 1934

1,958,280

UNITED STATES PATENT OFFICE 1,958,280

MICROSCOPE

William L. Patterson and George B. Gallasch, Rochester, N. Y., assignors to Bausch & Lomb Optical Company, Rochester, N. Y., a corporation of New York Application December 5, 1931, Serial No. 579,228

4 Claims. (Cl. 88—39)

This invention relates to microscopes and has for its chief object the provision of a plurality of oculars and means whereby said oculars may be selectively used. Another object is to provide an improved fine adjustment mechanism for a microscope. A further object is to provide a microscope having a body provided with a plurality of oculars and movable reflecting means whereby said oculars may be selectively used. These and other objects and advantages reside in certain novel features of construction, arrangement and combination of parts as will hereinafter be more fully described and pointed out in the appended claims.

Referring to the drawings:

Fig. 3 is a sectional view taken on line 3—3 of Fig. 2.

Fig. 4 is a sectional view taken on line 4—4 of Fig. 2.

Fig. 5 is a view taken on line 5—5 of Fig. 4.

Fig. 6 is a view taken on line 6—6 of Fig. 3.

Fig. 7 is a sectional view showing the prism system of the binocular attachment.

Fig. 8 is a schematic view showing the path of rays from the objective to the binocular body.

Figure 1:
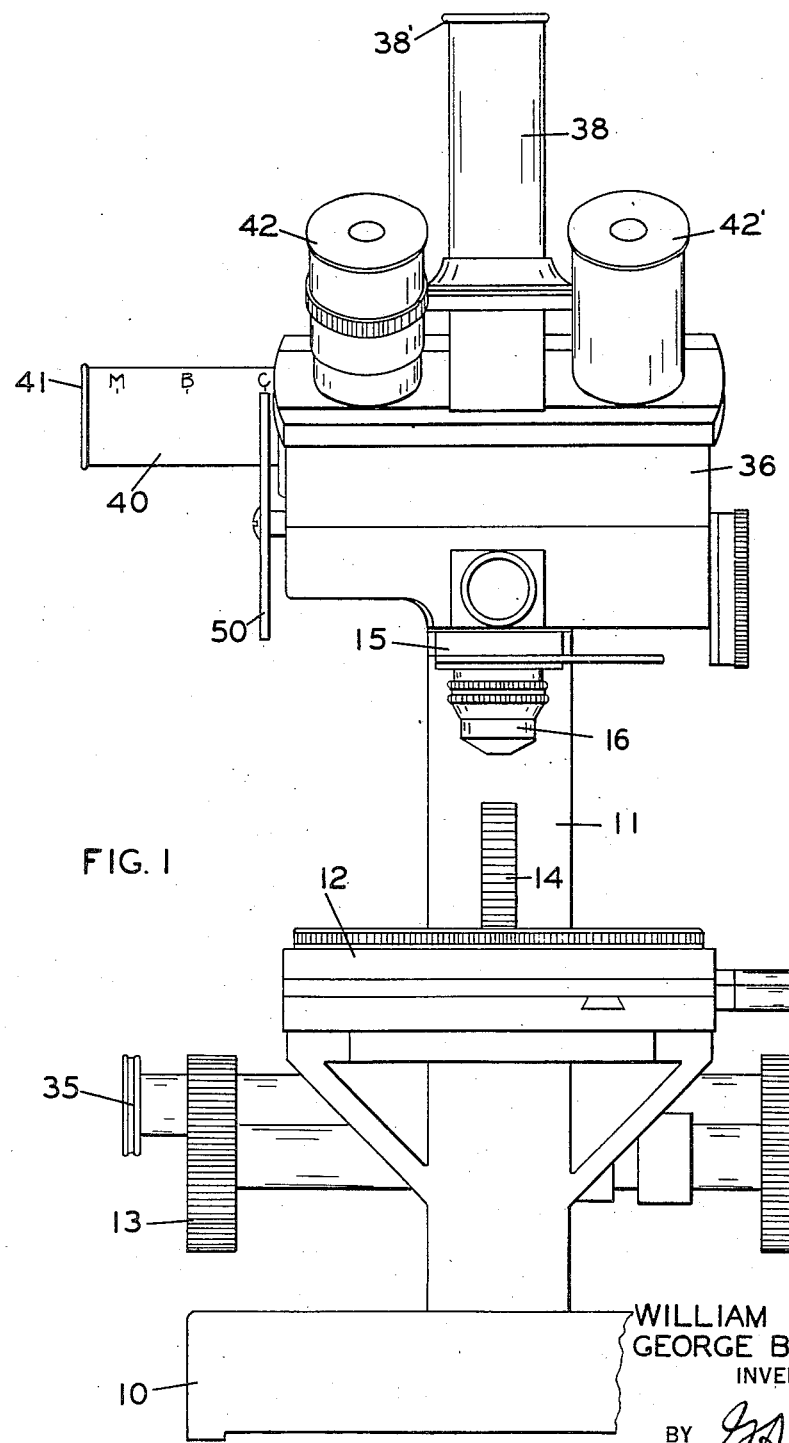
Fig. 1 is a front elevation of a microscope embodying our invention.

A preferred embodiment of our invention is shown in the drawings wherein 10 indicates a base which supports a hollow arm 11. Slidably mounted on arm 11 is a stage 12 which can be vertically adjusted by knobs 13 which turn a pinion (not shown) which cooperates with rack 14.

Figure 2:
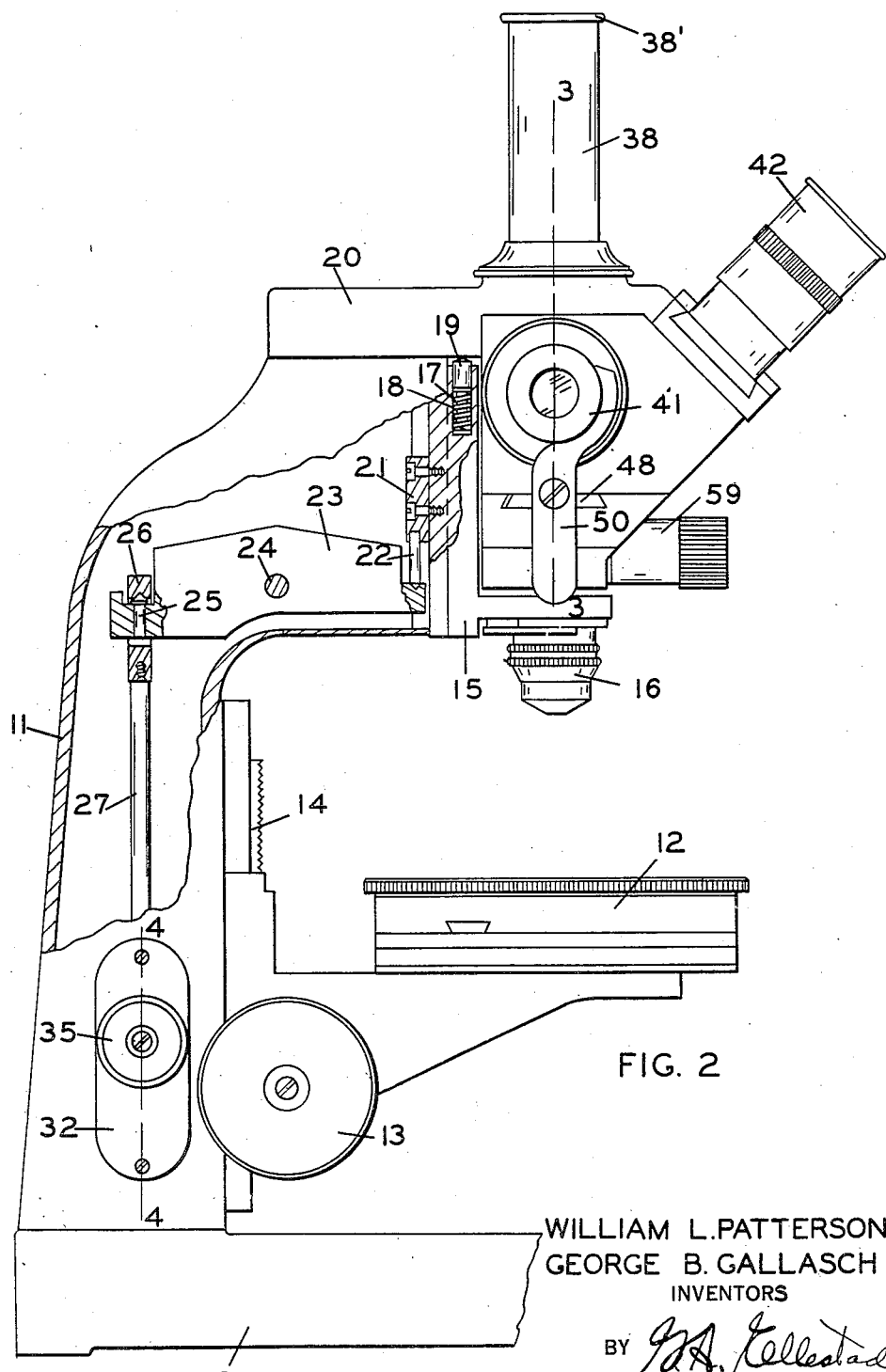
Fig. 2 is a side elevation of same, with parts in section.

As shown in Fig. 2, there is slidably mounted on the forward portion of arm 11 a right-angled bracket 15 which carries the objective lens 16. The bracket 15 is urged downwardly by a coil spring 17 which is mounted within the recess 18 in bracket 15 and urges the pin 19 into contact with the under side of member 20 attached to arm 11. Secured to bracket 15 is a block 21 which contacts with a thrust pin 22 resting on one end of lever 23 which is mounted to turn about the pivot 24. The other end of lever 23 carries a tapered bearing member 25 on which is hung a stirrup 26 carrying the rod 27. The lower end of rod 27 carries a stirrup 28 having the tapered bearing member 29 which contacts with the gear segment 30 pivotally mounted on arm 11 at 31. The two plates 32 and 32', attached to arm 11, provide bearings for the rotatably mounted shaft 33 which has a threaded portion 34 cooperating with the gear segment 30. Attached to shaft 33 are the two operating knobs 35 and 35'. It will be apparent, from the foregoing, that fine adjustment of the objective 16 can be effected by turning knobs 35 and 35'.

Secured to the member 20 is a housing 36 having on its top side an aperture 37 in which is mounted the vertically disposed tube 38 adapted to receive an ocular 38'. One of the side walls of the housing 36 is provided with an opening 39 in which is mounted a horizontally extending tube 40 adapted to receive an ocular such as shown at 41. Mounted on the front of housing 36 are the two oculars 42 and 42' which have their optical axes inclined to the vertical. A prism 43, having a half-silvered surface 44, cooperates with reflecting prisms 45, 46 and 47 to direct light rays into the two oculars 42 and 42' in a manner well known to those skilled in the art.

Slidably mounted on the bottom of housing 36 is a slide 48 having a rod 49 which projects through an opening in the side of the housing and is provided with a handle 50. Mounted on the slide 48 is the right-angled reflecting prism 51 and the prism 52 which has the two reflecting surfaces 53 and 54, as shown in Fig. 8. When the slide 48 is in the position shown in Fig. 3, light rays from the objective 16 are reflected into ocular 41 by prism 51. When the slide 48 is moved toward the left, in Fig. 3, so that prism 52 is positioned over objective 16, light rays from the objective are reflected by prism 52 into prism 43 and thence pass into the two inclined binocular eye pieces 42 and 42'. When the slide 48 is moved further toward the left, the opening 55 in the slide is in alignment with the objective 16 so that light rays from the objective pass directly upward and into the ocular carried by tube 38.

The microscope which we have illustrated in the drawings is especially adapted for use in taking photo-micrographs of opaque objects such as metallographic specimens, for example. For such work a suitable light source (not shown) is positioned so as to direct light rays into the tube 56 and diaphragm 57 and onto the inclined clear glass reflector 58, mounted on tube 59, by which they are reflected downward through the objective and onto the specimen. This is the usual type of vertical illuminator which is well known to those skilled in the art. The side tube 40 is preferably positioned adjacent to the shutter of a suitable camera as will be readily understood by those skilled in the art. With such an arrangement, light rays from the objective may be directed, selectively, into the monocular 38', into the binoculars 42 and 42' or into the ocular 41 and thence into a camera, not shown. This may be readily accomplished by merely moving the slide 48 so that the handle points to either M, B or C as shown on Fig. 1 which represent, respectively, monocular, binocular and camera. The coarse focusing adjustment is effected by moving the stage 12 by means of knob 13 and the knobs 35 or 35' serve to provide the fine adjustment by moving only the objective and its supporting bracket 15.

Although we have shown our invention as applied to a microscope using a vertical illuminator, it is obvious that it may be applied equally well to a microscope which uses any other type of illuminator. Our improved type of fine adjustment mechanism can obviously be applied to various types of microscopes. Various modifications can, of course, be made without departing from the spirit of our invention.

We claim:

1. A microscope comprising in combination a housing having an aperture, an objective lens mounted below said aperture, an ocular mounted on top of said housing, a second ocular mounted on a side of said housing, a pair of oculars and associated reflecting devices mounted on said housing and reflecting means movably mounted within said housing for selectively directing light rays from said objective into either of said oculars or into said pair of oculars.

2. A microscope comprising a housing having an aperture, an objective mounted below said aperture, an ocular mounted on said housing above said aperture, a second ocular mounted on the side of said housing, a pair of oculars and associated reflecting devices mounted on said housing, a slide movably mounted within said housing, two reflecting prisms carried by said slide, said prisms being arranged to be selectively positioned above said aperture whereby light rays from said objective may be selectively directed into said second ocular or into said pair of oculars.

3. A microscope comprising a support, a bracket slidably mounted on said support, a lens carried by said bracket, means for moving said bracket, said means comprising a lever pivotally mounted on said support, one end of said lever being connected to said bracket, a stirrup carried by the other end of said lever, a depending rod secured to said stirrup, a second stirrup carried by the lower end of said rod and having a tapered bearing, a segment pivotally mounted on said support, said segment having its under side in contact with said bearing member on said second stirrup and means for moving said segment.

4. A microscope comprising a support, a bracket slidably mounted on said support, a lens carried by said bracket, means for moving said bracket, said means comprising a lever pivotally mounted on said support, one end of said lever being operatively connected to said bracket, a tapered bearing member carried by the other end of the lever, a stirrup member resting on said bearing member, a rod depending from said stirrup member, a second bearing member carried by the lower end of said rod, a segment pivotally mounted on said support, the lower side of said segment being in contact with the second bearing member and means for moving said segment.

WILLIAM L. PATTERSON.
GEORGE B. GALLASCH.